(12) United States Patent
Matozaki et al.

(10) Patent No.: US 8,040,763 B2
(45) Date of Patent: Oct. 18, 2011

(54) OBJECTIVE LENS DRIVING DEVICE AND OPTICAL PICKUP DEVICE

(75) Inventors: Toshiya Matozaki, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/744,094

(22) PCT Filed: Sep. 1, 2008

(86) PCT No.: PCT/JP2008/065669
§ 371 (c)(1),
(2), (4) Date: May 21, 2010

(87) PCT Pub. No.: WO2009/072330
PCT Pub. Date: Jun. 11, 2009

(65) Prior Publication Data
US 2010/0284260 A1 Nov. 11, 2010

(30) Foreign Application Priority Data
Dec. 4, 2007 (JP) .................. 2007-313242

(51) Int. Cl.
*G11B 7/00* (2006.01)

(52) U.S. Cl. ............. 369/44.14; 720/683; 359/824
(58) Field of Classification Search ............. 369/44.15, 369/244.1; 720/683; 359/824
See application file for complete search history.

(56) References Cited

FOREIGN PATENT DOCUMENTS

| JP | 2003-67950 A | 3/2003 |
|----|--------------|--------|
| JP | 2003-178479 A | 6/2003 |
| JP | 2004-265514 A | 9/2004 |
| JP | 2005-92949 A | 4/2005 |
| JP | 2005-182926 A | 7/2005 |

*Primary Examiner* — Aristotelis Psitos
(74) *Attorney, Agent, or Firm* — Birch, Stewart, Kolasch & Birch, LLP

(57) ABSTRACT

An objective lens driving device includes a lens holder (3) holding an objective lens (1, 2), a stationary part (5) that supports the lens holder (3) via wires (7*a*, 7*b*), an electromagnetic coil (11*a*-11*d*, 12*a*-12*d*) provided on the lens holder, and a magnet (4*a*, 4*b*) provided on the stationary part and magnetized in a multipolar manner so that different magnetic pole surfaces are arranged on a surface of the magnet facing the electromagnetic coil. The lens holder has a convex portion (16*a*-16*d*, 17*a*-17*d*) on a surface thereof facing the magnet. The convex portion has at least one groove (601-604, 701-704) portion extending parallel to a direction of magnetic flux lines of the magnet facing the convex portion, and at least a surface of the convex portion is formed of material having magnetic property.

15 Claims, 10 Drawing Sheets

OBJECTIVE LENS DRIVING DEVICE AND OPTICAL PICKUP DEVICE

TECHNICAL FIELD

The present invention relates to optical pickup devices and objective lens driving devices thereof, and particularly relates to a technique for controlling an angular variation (inclination) of an optical axis of an objective lens that occur when the objective lens is driven in a focusing direction.

BACKGROUND ART

Optical discs currently in widespread use include a CD (Compact Disc) and a DVD (Digital Versatile Disc). Further, a BD (Blu-ray Disc) is becoming in widespread use as a next-generation optical disc, which has an increased disc capacity due to high density technology so as to store image information of higher resolution.

A recording and reproducing device using the optical disc is required to have a function to properly perform recording and reproducing on a plurality of optical discs so that not only the newest BD but also the DVD and CD owned by a user can be used.

In order to respond to a plurality of kinds of optical discs, a technology has been proposed in which a single objective lens has a plurality of focal positions. In this case, for example, objective lenses for reproducing information from three kinds of optical discs, i.e., the BD, DVD and CD, have different focal positions depending on wavelengths of laser beams to be used.

As a result, a working distance (WD) varies depending on the kind of the optical lens to be used.

Here, an object lens actuator is generally configured to generate a driving force in a focusing direction using an electromagnetic force between a coil mounted to a lens holder of a movable part and a magnet provided on a stationary part. If the working distance varies according to the kind of the optical disc to be used as described above, a reference position (i.e., a relative position with respect to the magnet of the stationary part) of the movable part in the focusing direction also varies according to the kind of the optical disc to be used.

If there are a plurality of reference positions of the movable part, it becomes difficult to keep the optical axis of the optical lens perpendicular to a recording surface of the optical disc (i.e., to suppress an angular variation in a radial direction), since a magnetic field distribution varies depending on the reference position.

Here, in order to keep the optical axis of the objective lens perpendicular to the recording surface of the optical disc, there has been proposed an objective lens driving device in which a lens holder is supported using a plurality of wires whose rigidities are different from each other (see, for example, Patent Document No. 1).

In this objective lens driving device, the lens holder is supported using four wires in total, two wires being disposed on each side of the lens holder. Further, upper two wires have higher rigidity than lower two wires, so that an upper part of the lens holder is less mobile than a lower part of the lens holder. This generates a torque in a direction to cancel a torque that causes an inclination of the lens holder, so as to suppress the angular variation of the optical axis of the objective lens.

In addition, there has been proposed another objective lens driving device of the wire-supporting type, in which midpoints of the wires are joined to side surfaces of the lens holder using damper gel, and applying positions of the damper gel differ in the left and right sides of the lens holder (see, for example, Patent Document No. 2). In this case, the inclination of the optical axis of the objective lens has been preliminarily measured, and the damper gel is applied to appropriate positions based on the measured inclination so as to suppress the angular variation of the optical axis of the objective lens.

Patent Document No. 1: Japanese Laid-Open Patent Publication No. 2003-178479 (FIGS. 11 and 13)
Patent Document No. 2: Japanese Laid-Open Patent Publication No. 2005-92949 (FIG. 13)

DISCLOSURE OF THE INVENTION

Problems to be Solved by the Invention

However, in the objective lens driving device disclosed in Patent Document No. 1, since the upper wires have higher rigidity than the lower wires, a torque can be generated in only one direction. In other words, a torque can be generated in a rotating direction about a rotation axis provided at an upper side, but cannot be generated in a rotating direction about an rotation axis provided at a lower side. Therefore, there is a possibility that the inclination cannot sufficiently be suppressed, depending on the direction of the inclination.

In addition, in the objective lens driving device disclosed in Patent Document No. 2, the applying positions of the damper gel on the side surfaces or the like of the lens holder can be adjusted based on the inclination of the optical axis of the objective lens. However, there is a possibility that the adjustment of the applying positions of the damper gel may cause other variation factors such as a variation of gravity center of the lens holder.

The present invention is intended to suppress an angular variation (i.e., an angular variation in a radial direction) of an optical axis of an objective lens with high accuracy while maintaining a stable supporting structure of an objective lens driving device without causing a variation of gravity center of a lens holder.

Moreover, the present invention is intended to suppress an angular variation of an optical axis of an objective lens without a need for complicated adjustment even when the present invention is applied to an objective lens driving device having a plurality of working distances corresponding to the kinds of the optical discs.

Means of Solving the Problems

An objective lens driving device according to the present invention includes an objective lens, a lens holder holding the objective lens, a stationary part that supports the lens holder via wires, an electromagnetic coil provided on the lens holder, and a magnet provided on the stationary part and magnetized in a multipolar manner so that different magnetic pole surfaces are arranged on a surface of the magnet facing the electromagnetic coil. The lens holder has a convex portion on a surface thereof facing the magnet. The convex portion has at least one groove portion extending parallel to a direction of magnetic flux-lines of the magnet facing the convex portion. At least a surface of the convex portion is formed of material having magnetic property.

Effect of the Invention

In the objective lens driving device of the present invention, when an inclination of the lens holder occurs such that an optical axis of the objective lens is inclined, the groove portion formed on the convex portion of the lens holder is inclined with respect to the magnetic flux lines of the magnet, and therefore a torque is exerted on the convex portion so as to bring an extending direction of the groove to be parallel to the magnetic flux lines. With this torque, the inclination of the lens holder is suppressed, and the angular variation of the optical axis of the objective lens mounted to the lens holder is suppressed.

DESCRIPTION OF REFERENCE MARKS

1 BD objective lens, 2 DVD objective lens, 3 lens holder, 4a, 4b magnet, 5 yoke, 6a, 6b relay board, 7a, 7b wire, 8a, 8b gel material, 9a, 9b stationary side relay board, 10 stationary side holder, 11a, 11b, 11c, lid focusing driving electromagnetic coil, 12a, 12b, 12c, 12d tracking driving electromagnetic coil, 13a, 13b, 13c, 13d, 14a, 14b, 14c, 14d magnetic piece, 15 magnetic flux line, 16a, 16b, 16c, 16d, 17a, 17b, 17c, 17d convex portion, 18a, 18b, 18c, 18d, 19a, 19b, 19c, 19d concave portion, 100 optical disc, 101 blue semiconductor laser, 102 BD diffraction grating, 103 polarization prism, 104 collimator lens, 105 mirror, 107 red/infrared semiconductor laser, 108 CD/DVD diffraction grating, 109 dichroic prism, 110 mirror, 112 power monitor light detector, 113 cylindrical lens, 114 light detector, 601, 602, 603, 604, 701, 702, 703, 704 groove portion, 801, 802, 901, 902 rib.

BEST MODE FOR CARRYING OUT THE INVENTION

Embodiment 1

Figure 1:
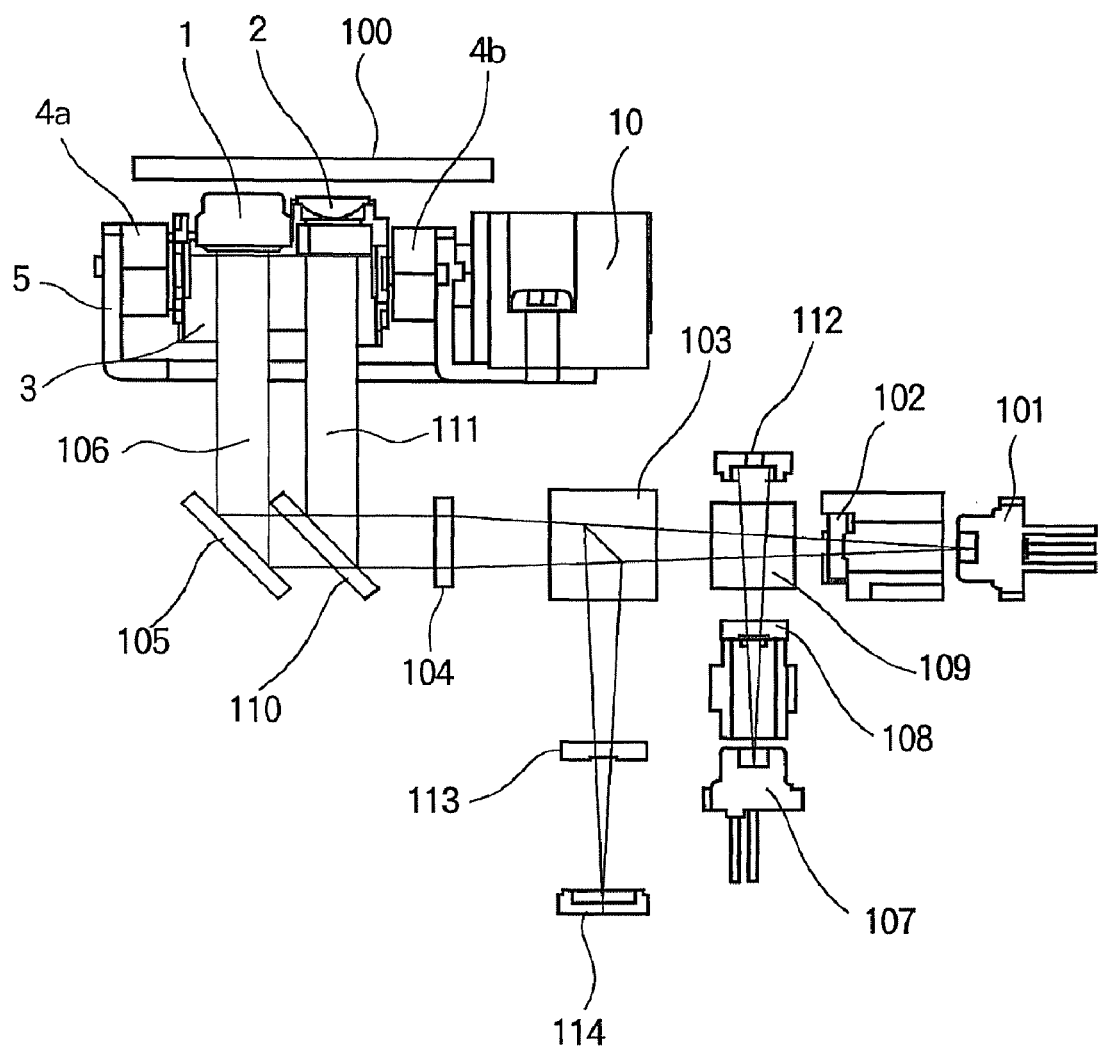
FIG. 1 is a view showing a basic configuration of an optical pickup device to which an objective lens driving device according to Embodiment 1 of the present invention is mounted.

FIG. 1 is a view showing a basic configuration of an optical pickup device to which an objective lens driving device according to Embodiment 1 of the present invention. The optical pickup device has a function to perform recording and/or reproducing of information on an optical disc 100 such as a CD, DVD, and BD.

The optical pickup device includes a blue semiconductor laser 101 as a BD light source, and a red/infrared dual-wavelength laser 107 as a DVD light source. A BD diffraction grating 102 is disposed on an emission side of the blue semiconductor laser 101, and a CD/DVD diffraction grating 108 is disposed on an emission side of the dual-wavelength laser 107. The blue semiconductor laser 101 and the dual-wavelength laser 107 are oriented so that emission optical axes thereof are perpendicular to each other, and a dichroic prism 109 is disposed on a position where both emission optical axes cross each other.

Further, a polarization prism 103, a collimator lens 104, a mirror 110 and a mirror 105 are disposed along a proceeding direction of a light emitted by the dichroic prism 109. A BD objective lens 1 is disposed in a proceeding direction of the light reflected by the mirror 110, and a CD/DVD objective lens 2 is disposed in a proceeding direction of the light reflected by the mirror 105.

Moreover, a power monitor light detector 112 is disposed on a side opposite to the semiconductor laser 107 with respect to the dichroic prism 109. A cylindrical lens 113 and a light detector 114 are disposed on a side to which a return light (described later) is reflected by the polarization prism 103 at approximately 90 degrees.

The blue laser emitted by the blue semiconductor laser 101 passes the BD diffraction grating 102 and the dichroic prism 109, passes the collimator lens 104 to become a parallel light flux, and further passes the mirror 110. Then, the blue laser is reflected by the mirror 105, is incident on the BD objective lens 1, and is focused on an information recording layer of the optical disc 100 (BD).

The return light from the optical disc 100 is reflected by the mirror 105, passes the mirror 110 and the collimator lens 104, and is incident on the polarization prism 103 to be reflected toward the light detector 114 side. Then, the return light passes the cylindrical lens 113, and is focused on a detection surface of the light detector 114.

In contrast, the infrared or red laser emitted by the dual-wavelength laser 107 passes the diffraction grating 108, is incident on the dichroic prism 109 to be reflected toward the collimator lens 104 side, and passes the collimator lens 104 to become parallel light flux. Further, the infrared or red laser is reflected by the mirror 110, is incident on the CD/DVD objective lens 2, and is focused on an information recording layer of the optical disc 100 (CD or DVD).

The return light from the optical disc 100 is reflected by the mirror 110, passes the collimator lens 104, and is incident on the polarization prism 103 to be reflected toward the light detector 114 side. Then, the return light passes the cylindrical lens 113, and is focused on the detection surface of the light detector 114.

The above described BD objective lens 1 and the CD/DVD objective lens 2 are fixed to a lens holder 3 (FIG. 2) of the objective lens driving device mounted to the optical pickup device.

Hereinafter, the objective lens driving device according to Embodiment 1 will be described in detail.

Figure 2:
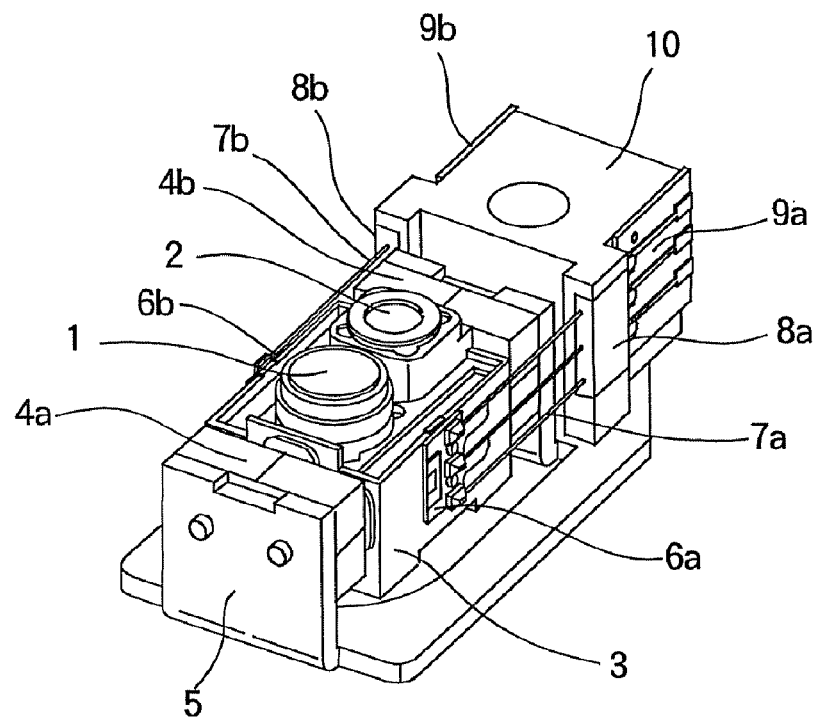
FIG. 2 is a perspective view showing an entire configuration of the objective lens driving device according to Embodiment 1 of the present invention.

FIG. 2 is a perspective view showing an entire body of the objective lens driving device according to Embodiment 1. The objective lens driving device includes a movable body including the lens holder 3 to which the objective lenses 1 and 2 are mounted and a stationary part that resiliently supports the movable part via wires.

The movable part includes the lens holder 3 composed of a lightweight molded article of resin material having a high rigidity. The BD objective lens 1 and CD/DVD objective lens 2 are mounted to the lens holder 3. The BD objective lens 1 and the CD/DVD objective lens 2 are tightly bonded to the lens holder 3 with high accuracy so as to obtain optimum optical property.

The lens holder 3 is formed into, for example, a substantially rectangular parallelepiped shape, and has both end surfaces (referred to as upper and lower surfaces) in a focusing direction, both end surfaces (referred to as left and right end surfaces) in a tracking direction, and both end surfaces (referred to as front and rear end surfaces) in a direction perpendicular to the focusing and tracking directions.

Figure 8A:
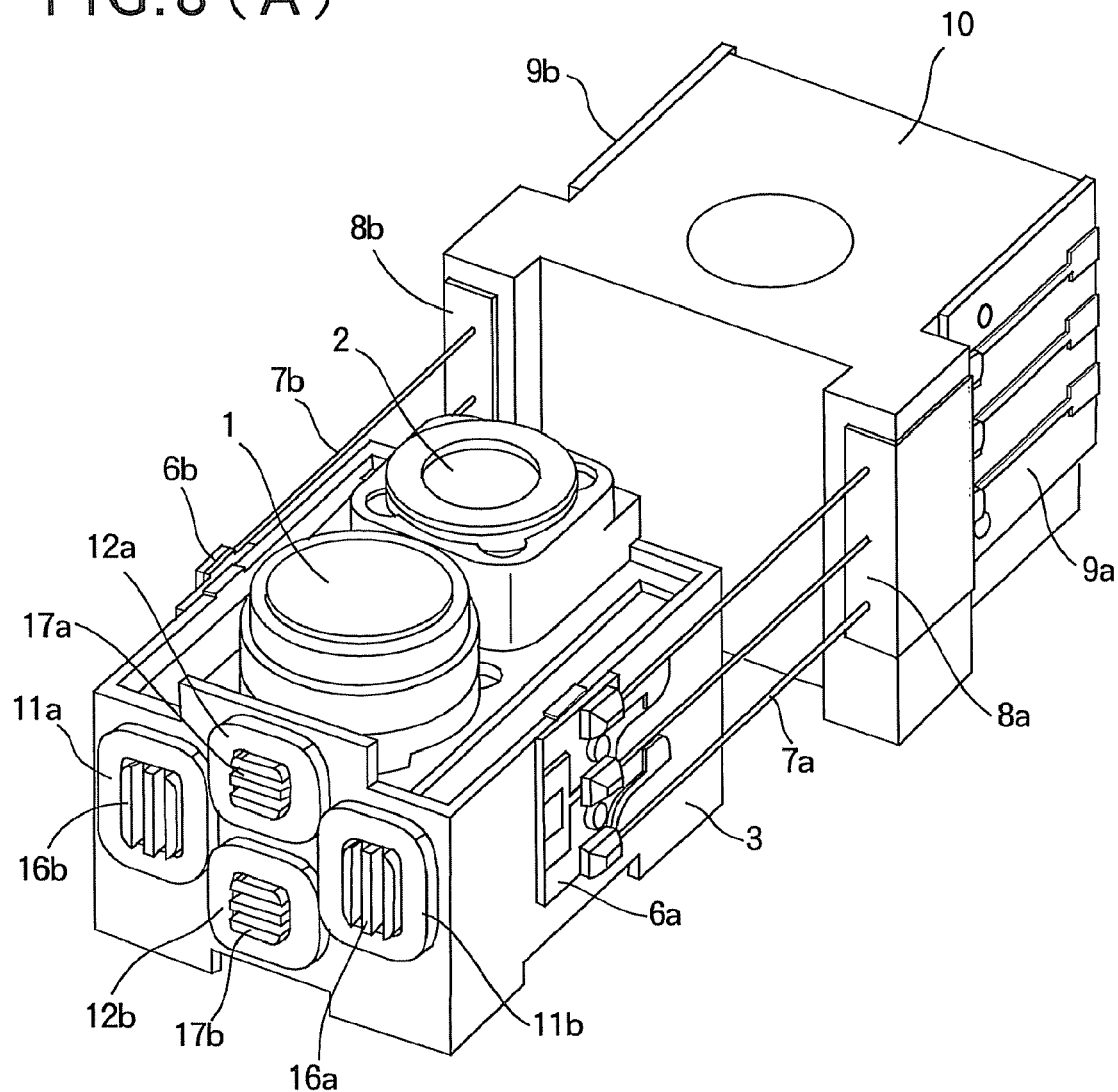
FIG. 8(A) is a perspective view showing a movable part and its surroundings of the objective lens driving device according to Embodiment 1 of the present invention.

Focusing driving electromagnetic coils 11a and 11b (FIG. 8(A)) and tracking driving electromagnetic coils 12a and 12b (FIG. 8(A)) are fixed to the front end surface of the lens holder 3. Similarly, focusing driving electromagnetic coils 11c and 11d (FIGS. 4 and 5) and tracking driving electromagnetic coils 12c and 12d (FIGS. 4 and 5) are fixed to the rear end surface of the lens holder 3. Further, not shown tilt driving electromagnetic coils are fixed to the lens holder 3. Using these respective electromagnetic coils, a position of the objective lens 1 (2) can be controlled in the focusing direction, the tracking direction and the tilt direction with respect to the optical disc, in accordance with an optical signal detected by the light detector 114.

Moreover, relay boards 6a and 6b are respectively bonded to the left and right end surfaces of the lens holder 3, and are connected to leads of the above described respective electromagnetic coils.

The movable part including the lens holder 3 is resiliently supported by the stationary part by means of six wires 7a and 7b. Three wires 7a and three wires 7b are respectively disposed on the left end surface and the right end surface of the lens holder 3. Respective one ends (front ends) of the wires 7a and 7b are soldered to the relay boards 6a and 6b, and the other ends (rear ends) of the wires 7a and 7b are soldered to relay boards 9a and 9b provided on a stationary side holder 10 of the stationary part. The wires 7a and 7b also function as an electricity supplying means for the respective electromagnetic coils of the lens holder 3.

The stationary part includes a yoke 5 which is a substantially plate-like member, and the stationary side holder 10 provided on the yoke 5. For example, the stationary side holder 10 is formed into a substantially parallelepiped shape, and has both end surfaces (upper and lower surfaces) in the focusing direction, both end surfaces (left and right end surfaces) in the tracking direction, and both end surface (front and rear end surfaces) in the direction perpendicular to the focusing and tracking directions.

The above described relay boards 9a and 9b are respective fixed to the left and right end surfaces of the stationary side holder 10. Further, gel materials 8a and 8b are provided on left and right sides of the front end surface of the stationary side holder 10. The gel materials 8a and 8b are provided tightly contacting the wires 7a and 7b, and have damping property so as to reduce resonant vibration of the movable part including the lens holder 3.

Figure 3:
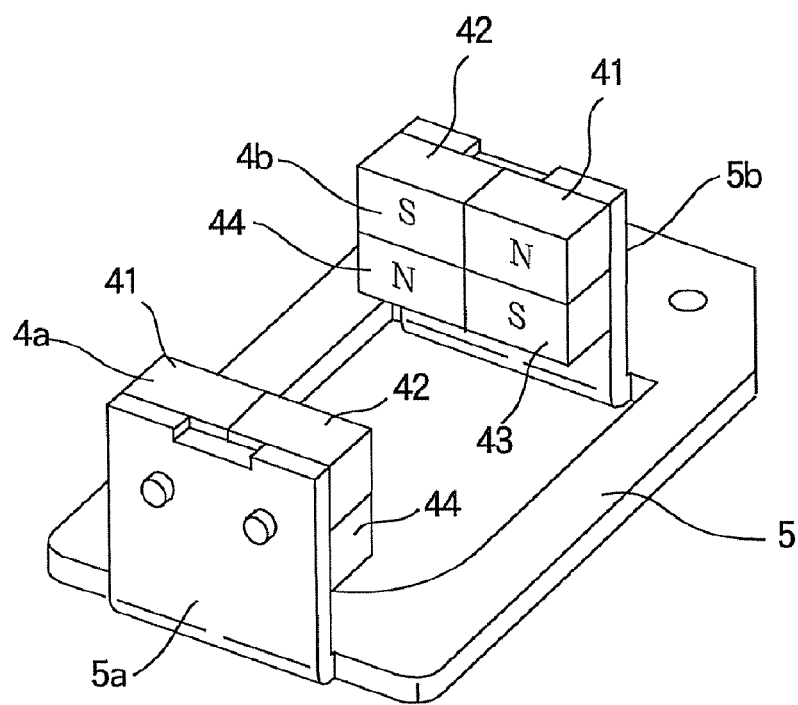
FIG. 3 is a perspective view showing a configuration of a yoke of the objective lens driving device according to Embodiment 1 of the present invention.

FIG. 3 is a perspective view showing the yoke 5 and magnets mounted to the yoke 5. The yoke 5 includes a pair of wall portions 5a and 5b facing each other in a front-rear direction. Magnets 4a and 4b are respectively fixed to surfaces of the wall portions 5a and 5b facing each other. Each of the magnets 4a and 4b is magnetized in a multipolar manner, and has magnetic pole surfaces facing the lens holder 3 which are divided into, for example, two in the focusing direction and in the tracking direction.

The magnets 4a and 4b respectively face the front and rear end surfaces of the lens holder 3. In other words, the magnet 4a faces the focusing driving electromagnetic coils 11a and 11b. (FIG. 8(A)) and the tracking driving electromagnetic coils 12a. and 12b (FIG. 8(B)) fixed to the front end surface of the lens holder 3. Moreover, the magnet 4b faces the focusing driving electromagnetic coils 11c and 11d (FIG. 4) and the tracking driving electromagnetic coils 12c and 12d (FIG. 5) fixed to the rear end surface of the lens holder 3. A driving-controlling of the lens holder 3 is performed by means of electromagnetic force generated by magnetic fields of the magnets 4a and 4b and currents flowing through the respective electromagnetic coils.

Figure 4:
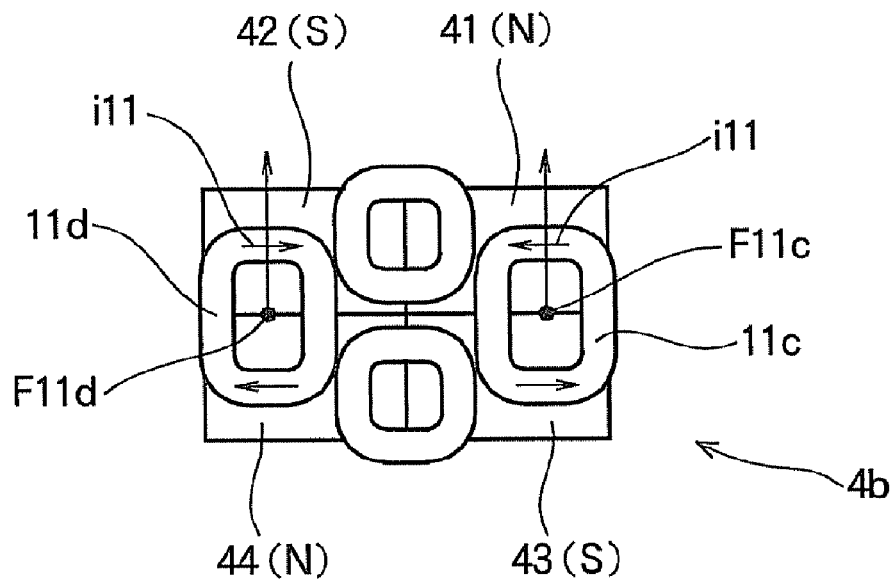
FIG. 4 is a view showing a principle of a generation of a driving force in a focusing direction of the objective lens driving device according to Embodiment 1 of the present invention.

FIG. 4 is a schematic view for illustrating a principle of a driving of the movable part including the lens holder 3 in the focusing direction. Of the above described magnets 4a and 4b, FIG. 4 shows the magnet 4b on the stationary holder 10 side and the focusing driving electromagnetic coils 11c and 11d facing the magnet 4b. Moreover, the magnetic pole surfaces of the magnet 4b, which are divided into total four parts, include an N-pole region 41 and an S-pole region 42 which are adjacent to each other in a left-right direction (in the tracking direction) and an S-pole region 43 and an N-pole region 44 respectively below (in the focusing direction) and adjacent to the N-pole region 41 and the S-pole region 42.

The focusing driving electromagnetic coil 11c is disposed so as to face both of the N-pole region 41 and the S-pole region 43 of the magnet 4b. Similarly, the focusing driving electromagnetic coil 11d is disposed so as to face both of the S-pole region 42 and the N-pole region 44 of the magnet 4b.

More specifically, in each of the focusing driving electromagnetic coils 11c and 11d, an upper side and a lower side (parts where current flows in directions parallel and opposite to each other) respectively face regions of opposite polarities to each other, and are positioned in the magnetic fields oriented in opposite directions to each other.

When a current "i11" flows through the focusing driving electromagnetic coils 11c and 11d in a direction as shown in the figure (for example, counterclockwise in the electromagnetic coil 11c, and clockwise in the electromagnetic coil 11d in the figure), with the focusing driving electromagnetic coils 11c and 11d being in the magnetic field, electromagnetic forces F11c and F11d are generated in the focusing direction (here, upward). The electromagnetic forces F11c and F11d are exerted on a gravity center of the movable part including the lens holder 3, and cause the movable part to move in the focusing direction. As a result, the objective lenses 1 and 2 (FIG. 2) mounted to the lens holder 3 move in the focusing direction.

By controlling an amount and direction of the current flowing through the focusing driving electromagnetic coils 11c and 11d, the position of the objective lenses 1 and 2 in the focusing direction can be controlled, so that a focusing error of a laser spot on the optical disc can be controlled.

Figure 5:
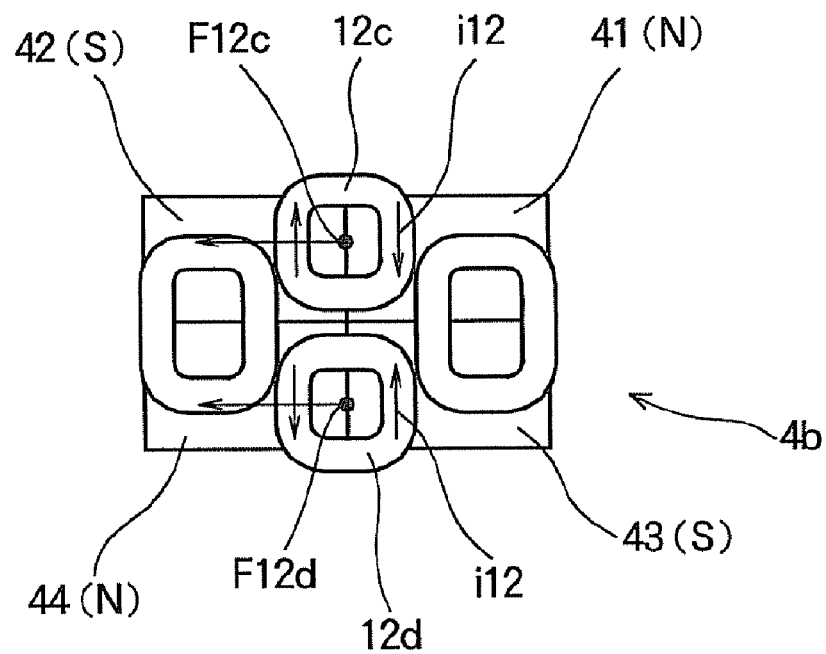
FIG. 5 is a view showing a principle of a generation of a driving force in a tracking direction of the objective lens driving device according to Embodiment 1 of the present invention.

FIG. 5 is a view for illustrating a principle of a driving of the movable part in the tracking direction. Of the above described magnets 4a and 4b, FIG. 5 shows the magnet 4b on the stationary holder 10 side and the tracking driving electromagnetic coils 12c and 12d facing the magnet 4b.

The tracking driving electromagnetic coil 12c is disposed so as to face both of the N-pole region 41 and the S-pole region 42 of the magnet 4b. Similarly, the tracking driving electromagnetic coil 12d is disposed so as to face both of the S-pole region 43 and the N-pole region 44 of the magnet 4b.

More specifically, in each of the tracking driving electromagnetic coils 12c and 12d, a right side and a left side (parts where current flows in directions parallel and opposite to each other) respectively face regions of opposite polarities to each other, and are positioned in the magnetic fields oriented in opposite directions to each other.

When a current "i12" flows through the tracking driving electromagnetic coils 12c and 12d in a direction as shown in the figure (for example, counterclockwise in the electromagnetic coil 12c, and clockwise in the electromagnetic coil 12d in the figure), with the tracking driving electromagnetic coils 12c and 12d being in the magnetic field, electromagnetic forces F12c and F12d are generated in the tracking direction (here, to the left). The electromagnetic forces F12c and F12d are exerted on the gravity center of the movable part including the lens holder 3, and cause the movable part to move in the tracking direction. That is, the objective lenses 1 and 2 (FIG. 1) mounted to the lens holder 3 move in the tracking direction.

By controlling an amount and direction of the current flowing through the tracking driving electromagnetic coils 12c and 12d, the position of the objective lenses 1 and 2 in the tracking direction can be controlled, so that a tracking error of the laser spot on the optical disc can be controlled.

Although FIGS. 4 and 5 show principles of the generation of the driving forces in the focusing direction and in the tracking direction by means of the magnet 4b and the respective electromagnetic coils 11c, 11d, 12c and 12d facing the magnet 4b, the magnet 4a and the respective electromagnetic coils 11a, 11b, 12a and 12b facing the magnet 4a also generate the driving forces in the focusing direction and in the tracking direction according to the same principle.

Figure 6:
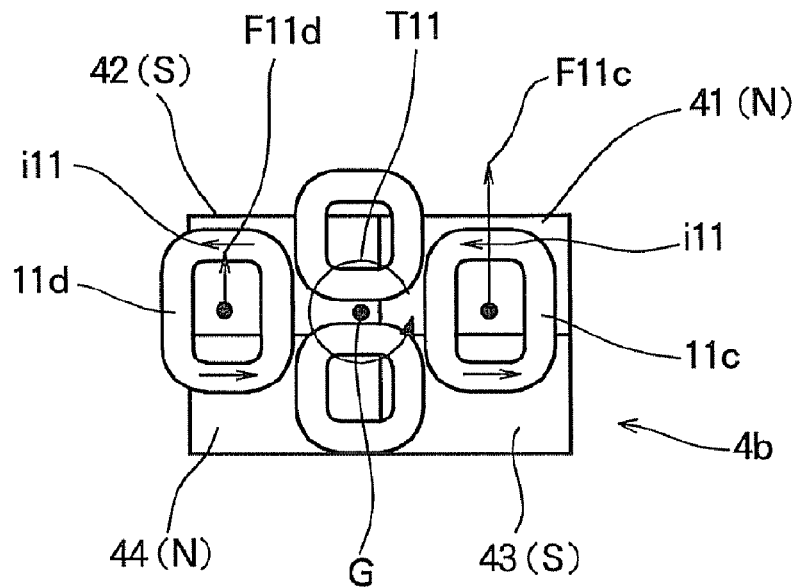
FIG. 6 is a view for illustrating a cause of an angular variation of a movable part of a conventional objective lens driving device.

FIG. 6 is a view for illustrating a principle of a occurrence of an inclination of the movable part of the objective lens driving device, in which the lens holder 3 is omitted. In FIG. 6, it is assumed that the movable part is in a position shifted in the focusing direction (vertical direction in the figure) by a predetermined amount by the controlling of the current flowing through the focusing driving electromagnetic coils 11c and 11d. Moreover, it is assumed that no current flows through the tracking driving electromagnetic coils 12c and 12d, but the movable part is in a position shifted in the tracking direction (left-right direction in the figure) with respect to the magnet 4b due to reasons such as variation.

As the control current i11 flows through the focusing driving electromagnetic coils 11c and 11d, the electromagnetic force is generated by the current and the magnetic field as described above. However, in a state where the relative position of the movable part with respect to the magnet 4b is shifted as shown in FIG. 6, the focusing driving electromagnetic coil 11c and the focusing driving electromagnetic coil 11d are positioned in the magnetic fields of different intensities, and therefore a difference occurs between the generated electromagnetic forces F11c and F11d.

In other words, in an example shown in FIG. 6, the focusing driving electromagnetic coil 11c is shifted toward a center of the magnet 4b, and therefore is positioned in the magnetic field of relatively high intensity, so that the generated magnetic force F11c becomes relatively large. In contrast, the focusing driving electromagnetic coil 11d is shifted toward an outer side of the magnet 4b, and therefore is positioned in the magnetic field of relatively low intensity, so that the generated magnetic force F11d becomes relatively small.

Figure 7:
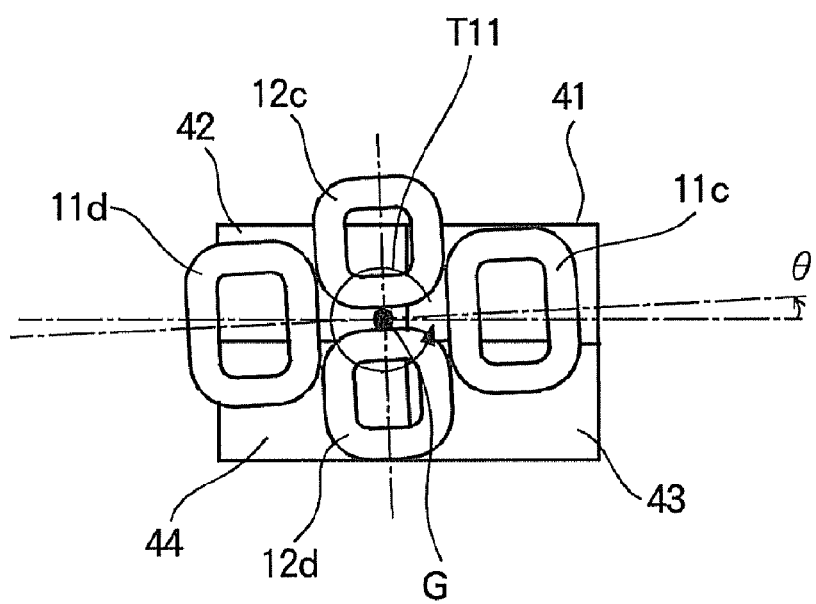
FIG. 7 is a view for illustrating the cause of the angular variation of the movable part of the conventional objective lens driving device.

As a result, a torque T11 in a direction to cause the movable part to rotate about the gravity center G is generated due to the difference between the electromagnetic force F11c and the electromagnetic force F11d on both sides of the gravity center G of the movable part including the lens holder 3. The torque T11 causes the movable part to be inclined as shown in FIG. 7, which results in variations of angles (perpendicularity to the optical disc 100) of optical axes of the objective lenses 1 and 2.

In Embodiment 1 of the present invention, such angular variations of the optical axes of the objective lenses 1 and 2 are suppressed using a configuration as described below.

FIG. 8(A) is a perspective view showing the movable part and its surroundings of the objective lens driving device according to Embodiment 1 of the present invention. In the objective lens driving device according to Embodiment 1, convex portions 16a, 16b, 17a and 17b with groove portions are provided on the front end surface of the lens holder 3 facing the magnet 4a, and convex portions 16c, 16d, 17c and 17d (FIGS. 9(B) and 9(C)) with groove portions are provided on the rear end surface of the lens holder 3 facing the magnet 4b.

The convex portions 16a, 16b, 17a and 17b are disposed in hollow portions in respective windings of the focusing driving electromagnetic coils 11a and 11b and the tracking driving electromagnetic coils 12a and 12b. The convex portions 16a, 16b, 17a and 17b respectively have groove portions 601, 602, 701 and 702 (FIG. 8(B)) so that at least one groove portion is provided on each convex portion. The groove portions 601, 602, 701 and 702 face boundaries between different magnetic-poles (magnetic pole boundaries) facing the respective convex portions.

Figure 8B:
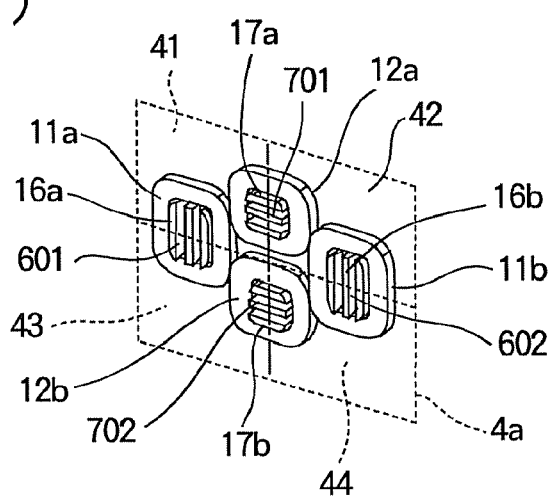
FIG. 8(B) is a perspective view showing a relationship between groove portions of the movable part and respective magnetic poles of a magnet of the objective lens driving device.

FIG. 8(B) schematically shows a relationship between the respective groove portions 601, 602, 701 and 702 and respective magnetic poles of the magnet 4a.

In this regard, the magnetic pole surfaces of the magnet 4a have been divided into four, and include the N-pole 41 and the S-pole 42 adjacent to each other in the left-right direction and the S-pole 43 and the N-pole 44 below and adjacent to the N-pole 41 and the S-pole 42.

The groove portions 601 of the convex portion 16a are disposed so as to face the boundary between the N-pole region 41 and the S-pole region 43 of the magnet 4 which are adjacent to each other in the vertical direction (the focusing direction). Similarly, the groove portions 602 of the convex portion 16b are disposed so as to face the boundary between the S-pole region 42 and the N-pole region 44 which are adjacent to each other in the vertical direction (the focusing direction).

Moreover, the groove portions 701 of the convex portion 17a are disposed so as to face the boundary between the N-pole region 41 and the S-pole region 42 of the magnet 4 which are adjacent to each other in the left-right direction (the tracking direction). Similarly, the groove portions 702 of the convex portion 17b are disposed so as to face the boundary between the S-pole region 43 and the N-pole region 44 which are adjacent to each other in the left-right direction (the tracking direction).

Moreover, the groove portions 601 of the convex portion 16a extend in a direction of the magnetic flux lines between the N-pole region 41 and the S-pole region facing the convex portion 16a, i.e., extends in the focusing direction. Similarly, the groove portions 602 of the convex portion 16b extend in a direction of the magnetic flux lines between the S-pole region 42 and the N-pole region 44 facing the convex portion 16b, i.e., extends in the focusing direction.

Moreover, the groove portions 701 of the convex portion 17a extend in a direction of the magnetic flux lines between the N-pole region 41 and the S-pole region facing the convex portion 16a, i.e., extends in the tracking direction. Similarly, the groove portions 702 of the convex portion 17b extend in a direction of the magnetic flux lines between the S-pole region 43 and the N-pole region 44 facing the convex portion 16b, i.e., extends in the tracking direction.

In this embodiment, surfaces of the convex portions 16a, 16b, 17a and 17b are subjected to plating treatment using material having magnetic property (for example, nickel). Moreover, inner surfaces (at least inner side surfaces) of the groove portions 601, 602, 701 and 702 are subjected to plating treatment using material having magnetic property. When the plating treatment is performed, for example, a surface-activation treatment is first performed using a laser irradiation or chemical solvent, and then the plating treatment is performed using magnetic material such as nickel. In this regard, it goes without saying that it is possible to use other method than the plating treatment as long as at least the surfaces (including inner side surfaces of the groove portions) of the respective convex portions are formed of material having magnetic property.

Moreover, although not shown in FIG. 8(A), the convex portions 16c, 16d, 17c and 17d provided on the rear end surface (the end surface facing the magnet 4b) are disposed in hollow portions in the respective windings of the focusing driving electromagnetic coils 16c and 11d (FIG. 4) and the tracking driving electromagnetic coils 12c and 12d (FIG. 5), and have groove portions which are the same as the groove portions 601, 602, 701 and 702 of the above described convex portions 16a, 16b, 17a and 17b.

Figure 9A:
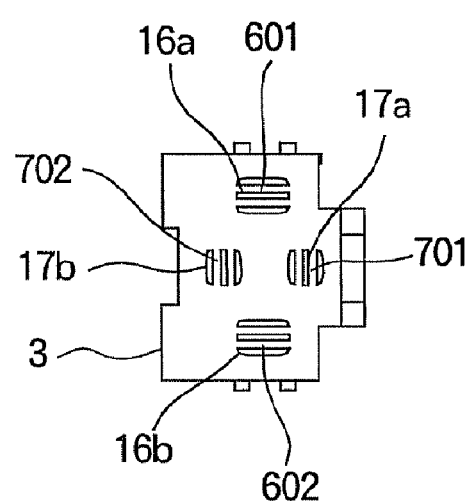
FIGS. 9(A), 9(B) and 9(C) are a front view, a plan view and a side view of a lens holder of the objective lens driving device according to Embodiment 1 of the present invention.
Figure 9B:
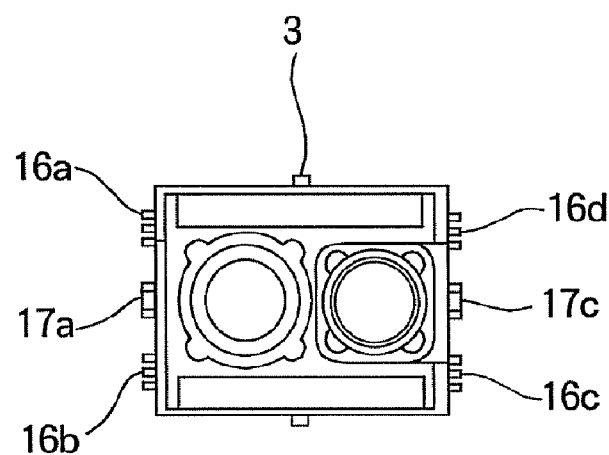
Figure 9C:
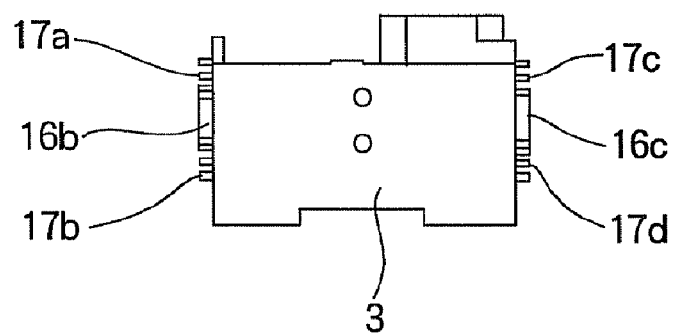

FIGS. 9(A), 9(B) and 9(C) are respectively a front view, a plan view and a side view of the lens holder 3.

As shown in FIGS. 9(A), 9(B) and 9(C), the lens holder 3 is composed of the resin molded article of a substantially rectangular parallelepiped shape, and the objective lenses 1 and 2 (FIG. 2) shown in FIG. 8(A) are mounted to an upper side thereof. Moreover, the respective electromagnetic coils 11a-11d and 12a-12d (FIGS. 4, 5, 8(A)) are fixed to the front end surface and the rear end surface of the lens holder 3, and the relay boards 6a and 6b (FIG. 8(A)) are fixed to both side end surfaces of the lens holder 3.

Each of the convex portions 16a, 16b, 17a and 17b provided on the front end surface of the lens holder 3 and the convex portions 16c, 16d, 17c and 17d provided on the rear end surface of the lens holder 3 has a shape taking into account a removing direction of a mold. To be more specific, each of the convex portions 16a-16d and the convex portions 17a-17d is formed as a plurality of rail-like protrusions formed on and protrude from the front end surface and the rear end surface of the lens holder 3. Moreover, the above described groove portions 601, 602, 701 and 702 are defined between the respective protrusions, and bottoms of the respective groove portions are aligned with, for example, the front end surface or the rear end surface of the lens holder 3.

Since the lens holder 3 have the convex portions 16a-16d and 17a-17d with the groove portions, a torque is exerted on the lens holder 3 so as to keep extending directions of the groove portions of the convex portions 16a-16d and 17a-17d parallel to the direction of the magnetic flux lines of the magnets 4a and 4b, so that the inclination of the lens holder 3 is suppressed.

To be more specific, in FIG. 8(B), if the groove portions 601 of the convex portion 16a are inclined with respect to the direction (i.e., the focusing direction) of the magnetic flux lines from the N-pole region 41 to the S-pole region 43 at the magnetic pole boundary facing the convex portion 16a, a torque is exerted on the convex portion 16a so as to keep the groove portions 601 (more specifically, a magnetic plane defined by the extending direction and a depth direction of the groove portion 601) parallel to the direction of the magnetic flux lines. Similarly, torques are exerted on the convex portions 16b, 17a and 17b so as to keep the respective groove portions 602, 701 and 702 parallel to the direction of the magnetic flux lines at the magnetic pole boundaries facing the respective convex portions 16b, 17a and 17b.

The torques exerted on the respective convex portions 16a, 16b, 17a and 17b become a torque for causing the movable part including the lens holder 3 to rotate about the gravity center. This torque acts to cancel the torque (the torque T11 in FIG. 6) causing the inclination of the movable part. Similar torque is exerted on the convex portions 16c, 16d, 17c and 17d which are not shown in FIG. 8(B). As a result, the inclination of the movable part including the lens holder 3 can be suppressed, and the angular variation of the optical axes of the objective lenses 1 and 2 can be suppressed. That is, the optical axes of the objective lenses 1 and 2 can be kept perpendicular to the recording surface of the optical disc 100.

As described above, according to the objective lens driving device of this embodiment, the convex portions 16a-16d and 17a-17d at least the surfaces of which are composed of material having magnetic property are provided on the surfaces of the lens holder 3 facing the magnets 4a and 4b, and the respective convex portions 16a-16d and 17a-17d have the groove portions (so that at least one groove portion is provided on each convex portion) extending in the direction of magnetic flux lines of the magnets 4a and 4b facing the convex portions. With this configuration, if the inclination of the lens holder 3 occurs, the torque is exerted on the respective convex portions 16a-16d and 17a-17d so as to bring the extending direction of the respective groove portions to be parallel to the magnetic flux lines. With this torque, the inclination of the lens holder 3 is suppressed, and the angular variation (angular variation in the radial direction) of the optical axes of the objective lenses 1 and 2 are suppressed.

Moreover, the convex portions 16a-16d and 17a-17d are disposed inside the focusing driving electromagnetic coils 11a-11d and the tracking driving electromagnetic coils 12a-12d, and therefore the convex portions 16a-16d and 17a-17d can be faced with the respective magnetic pole boundaries using simple configuration.

Moreover, the respective convex portions 16a-16d and 17a-17d are provided on the surfaces of the lens holder 3 facing the magnets 4a and 4b at positions symmetrical to each other in the focusing direction and in the tracking direction with respect to the gravity center of the lens holder 3. Therefore, the torques generated at the respective convex portions 16a-16d and 17a-17d can be integrated, so as to produce the torque in the direction in which the inclination of the lens holder 3 is suppressed.

Embodiment 2

In the above described Embodiment 1, the lens holder is provided with the convex portions having the groove portions and formed by resin molding, and the convex portions are subjected to the plating treatment. In contrast, in Embodiment 2, magnetic pieces composed of material having magnetic property (for example, nickel) are fixed to the lens holder 3.

Figure 10:
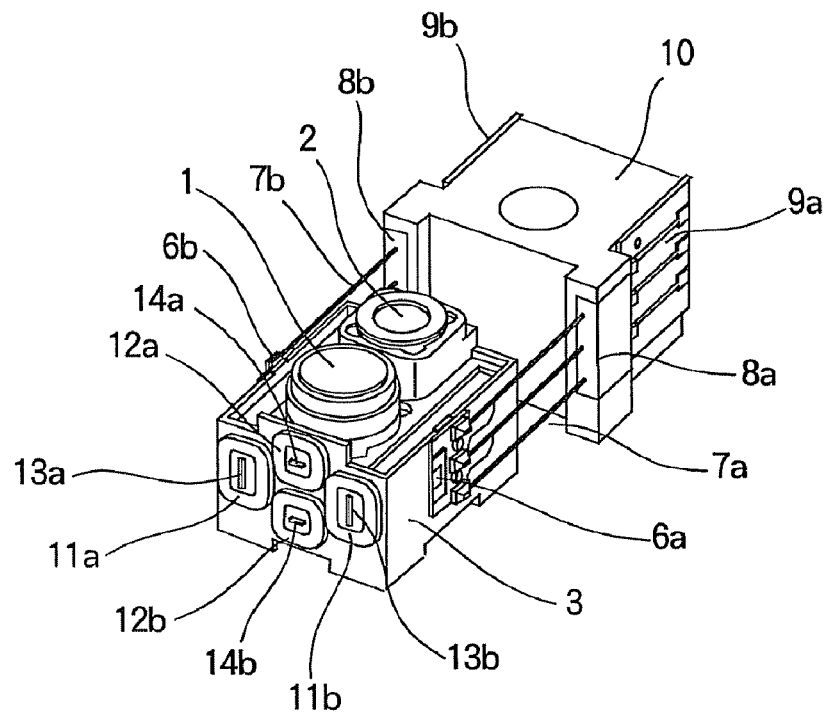
FIG. 10 is a perspective view showing a movable part and its surroundings of an objective lens driving device according to Embodiment 2 of the present invention.
Figure 11:
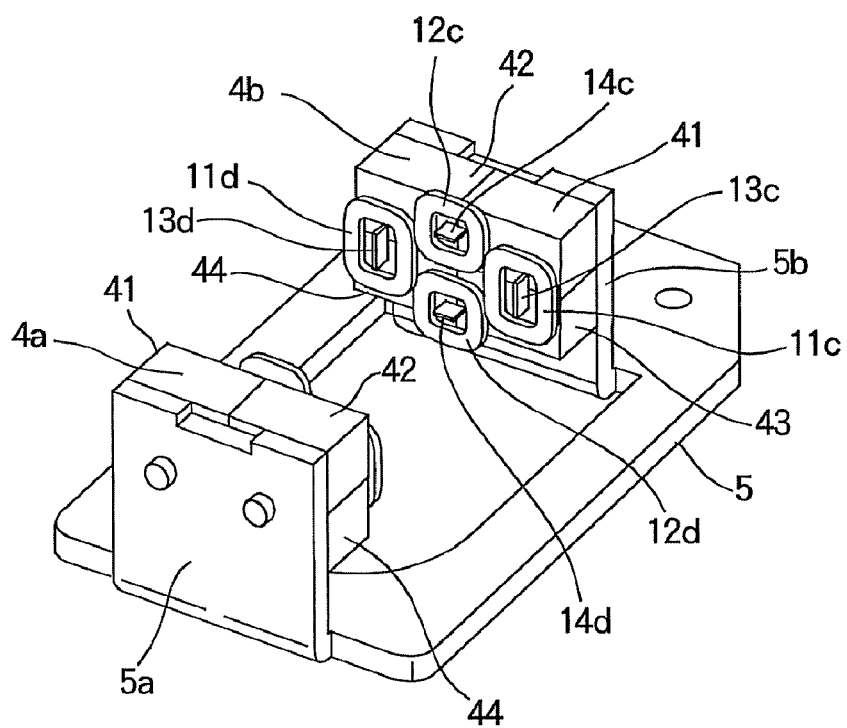
FIG. 11 is a perspective view showing an arrangement of a magnetic circuit of a stationary part and electromagnetic coils and magnetic pieces of the movable part of the objective lens driving device according to Embodiment 2 of the present invention.

FIG. 10 is a perspective view showing a movable part and its surroundings of an objective lens driving device according to Embodiment 2 of the present invention. FIG. 11 is a schematic view showing a positional relationship between a yoke, magnets, electromagnetic coils and magnetic pieces of the objective lens driving device according to Embodiment 2.

As shown in FIG. 10, magnetic pieces 13a, 13b, 14a and 14b are provided on the front end surface of the lens holder 3 so as to be disposed in hollow portions of windings of the focusing driving electromagnetic coils 11a and 11b and the tracking driving electromagnetic coils 12a and 12b. As shown in FIG. 11, the magnetic pieces 13c, 13d, 14c and 14d are provided on the rear end surface (omitted in FIG. 11) of the lens holder 3 so as to be disposed in hollow portions of windings of the focusing driving electromagnetic coils 11c and 11d and the tracking driving electromagnetic coils 12c and 12d.

The magnetic pieces 13a-13d and 14a-14d are substantially in the form of plates having surfaces perpendicular to the magnetic pole surfaces of the magnets 4a and 4b.

As shown in FIG. 11, the magnetic piece 13c is disposed so as to face the boundary between the N-pole region 41 and the S-pole region 43 of the magnet 4b which are adjacent to each other in the focusing direction. The magnetic piece 13d is disposed so as to face the boundary between the S-pole region 42 and the N-pole region 44 of the magnet 4b which are adjacent to each other in the focusing direction.

Moreover, the magnetic piece 14c is disposed so as to face the boundary between the N-pole region 41 and the S-pole region 42 of the magnet 4b which are adjacent to each other in the tracking direction. The magnetic piece 14d is disposed so as to face the boundary between the S-pole region 43 and the N-pole region 44 of the magnet 4b which are adjacent to each other in the tracking direction.

Further, the magnetic piece 13c extends in the direction of the magnetic flux lines between the N-pole region 41 and the S-pole region 43 facing the magnetic piece 13c, i.e., extends in the focusing direction. Similarly, the magnetic piece 13d extends in the direction of the magnetic flux lines between the S-pole region 42 and the N-pole region 44 facing the magnetic piece 13d, i.e., extends in the focusing direction.

Moreover, the magnetic piece 14c extends in the direction of the magnetic flux lines between the N-pole region 41 and the S-pole region 42 facing the magnetic piece 14c, i.e., extends in the tracking direction. Similarly, the magnetic piece 14d extends in the direction of the magnetic flux lines between the S-pole region 43 and the N-pole region 44 facing the magnetic piece 14d, i.e., extends in the tracking direction.

Here, a relationship between the magnet 4b and the magnetic pieces 13c, 13d, 14c and 14d have been described. The same applies for the relationship between the magnet 4a and the magnetic pieces 13a, 13b, 14a and 14b (FIG. 10).

With such a configuration, if the inclination of the lens holder 3 occurs, torques are exerted on the respective magnetic pieces 13a-13d and 14a-14d so as to keep extending directions of the respective magnetic pieces 13a-13d and 14a-14d parallel to the direction of the magnetic flux lines of the magnets 4a and 4b. This will be explained with reference to FIGS. 12, 13, 14 and 15.

Figure 12:
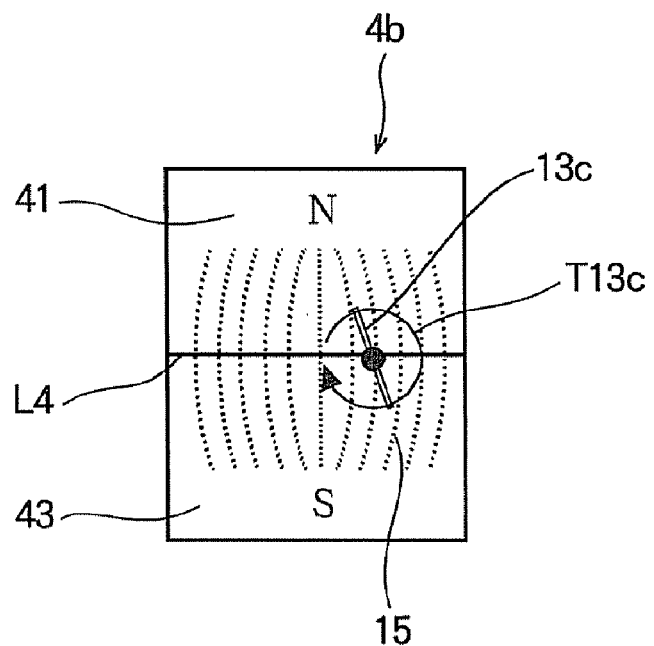
FIG. 12 is a view showing a principle of a suppression of an inclination according to Embodiment 2 of the present invention.
Figure 13:
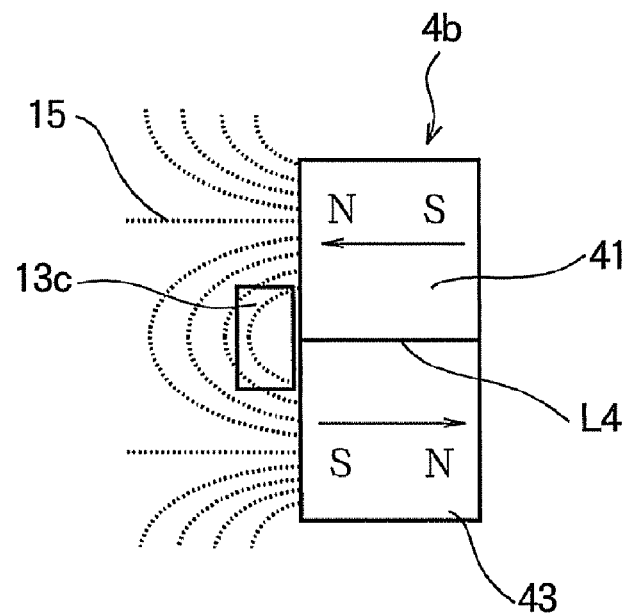
FIG. 13 is a view showing the principle of the suppression of the inclination according to Embodiment 2 of the present invention.

FIGS. 12 and 13 are a front view and a side view showing a state where the magnetic piece 13c is placed in the magnetic field (the magnetic flux lines 15) between the N-pole region 41 and the S-pole region 43 of the magnet 4b which are adjacent to each other in the focusing direction.

In a state shown in FIG. 12, the magnetic piece 13c extends obliquely with respect to the direction of the magnetic flux lines 15 from the N-pole region 41 to the S-pole region 43 (more specifically, a tangential direction of the magnetic flux lines 15 at the magnetic pole boundary L4). Therefore, a torque T13c is exerted on the magnetic piece 13c in a direction in which an area parallel to the magnetic flux lines 15 increases and an area perpendicular to the magnetic flux lines 15 decreases.

This torque T13c is exerted on the magnetic piece 13c so that the magnetic piece 13c becomes parallel to the above described tangential line of the magnetic flux lines and the magnetic piece 13c extends over the N-pole region 41 and the S-pole region 43 in a symmetrical manner (FIG. 13).

Figure 14:
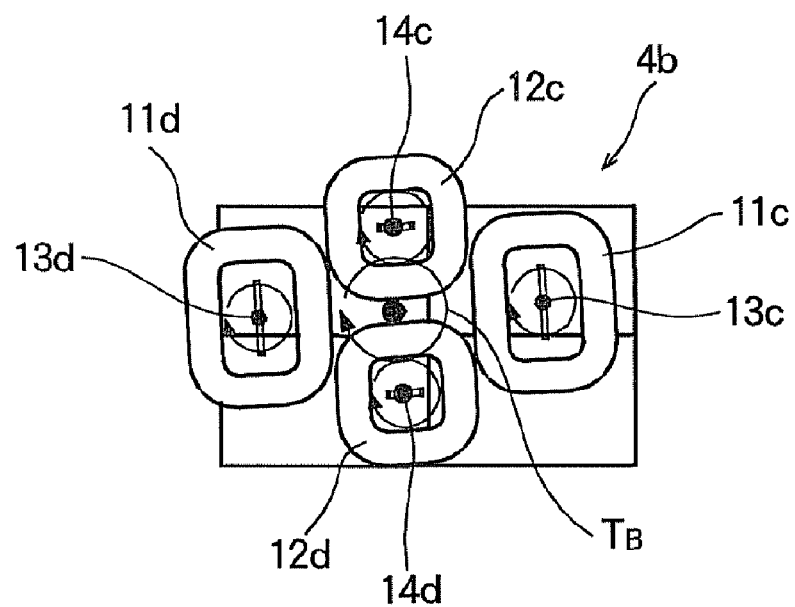
FIG. 14 is a view showing the principle of the suppression of the inclination according to Embodiment 2 of the present invention.
Figure 15:
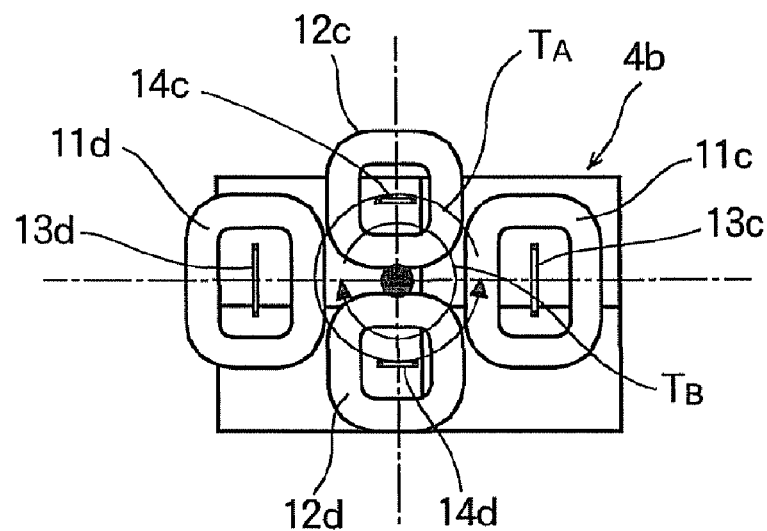
FIG. 15 is a view showing the principle of the suppression of the inclination according to Embodiment 2 of the present invention.

FIGS. 14 and 15 are schematic views showing the relationship between the respective electromagnetic coils 11c, 11d, 12c and 12d and the magnetic pieces 13c, 13d, 14c and 14d.

As shown in FIG. 14, the magnetic pieces 13c, 13d, 14c and 14d are disposed inside the respective electromagnetic coils 11c, 11d, 12c and 12d. If the inclination of the lens holder 3 occurs (if the extending directions of the respective magnetic pieces are inclined with respect to the direction of the magnetic flux lines), torques are generated in the respective magnetic pieces 13c, 13d, 14c and 14d so as to cancel the inclinations of the respective magnetic pieces. The torques generated in the respective magnetic pieces 13c, 13d, 14c and 14d are integrated, so as to produce a torque $T_B$ in a direction in which the movable part including the lens holder 3 to rotate about the gravity center G.

As a result, as shown in FIG. 15, the torque $T_B$ in an opposite direction to a torque $T_A$ that causes the inclination of the lens holder 3 (for example, the torque T11 shown in FIG. 6) acts to cancel the torque $T_A$. With such a configuration, the inclination of the lens holder 3 can be suppressed, and the angular variations of the optical axes of the objective lenses 1 and 2 can be corrected.

As described above, according to this embodiment, the magnetic pieces 13a-13d and 14a-14d are provided on the surfaces of the lens holder 3 facing the magnets 4a and 4b, and the magnetic pieces 13a-13d and 14a-14d extend parallel to the direction of the magnetic flux lines of the magnets 4a and 4b facing the magnetic pieces 13a-13d and 14a-14d. With this configuration, when the inclination of the lens holder 3 occurs, the torque are exerted on the respective magnetic pieces 13a-13d and 14a-14d so as to bring the extending direction of the respective magnetic pieces to be parallel to the magnetic flux lines. With such torques, the inclination of the lens holder 3 is suppressed, and the angular variations of the optical axes of the objective lenses 1 and 2 are suppressed.

Moreover, the respective magnetic pieces 13a-13d and 14a-14d are disposed in the hollow portions of respective windings of the focusing driving electromagnetic coils 11a-11d and the tracking driving electromagnetic coils 12a-12d, and therefore the magnetic pieces 13a-13d and 14a-14d can be faced with the respective magnetic pole boundaries using simple configuration.

Moreover, the respective magnetic pieces 13a-13d and 14a-14d are provided on the surfaces of the lens holder 3 facing the magnets 4a and 4b at positions symmetrical to each other in the focusing direction and in the tracking direction with respect to the gravity center of the lens holder 3. Therefore, the torques generated in the respective magnetic pieces 13a-13d and 14a-14d can be integrated, so as to produce the torque in the direction in which the inclination of the lens holder 3 is suppressed.

In this regard, FIGS. 12-15 are views for illustrating the principle of the suppression of the inclination of the movable part in this embodiment. However, FIGS. 12-15 also show the principle of the suppression of the inclination of the movable part in Embodiment 1, when the magnetic pieces 13c, 13d, 14c and 14d are replaced with the groove portions 601, 602, 701 and 702 (FIG. 8(B)).

Embodiment 3

Figure 16:
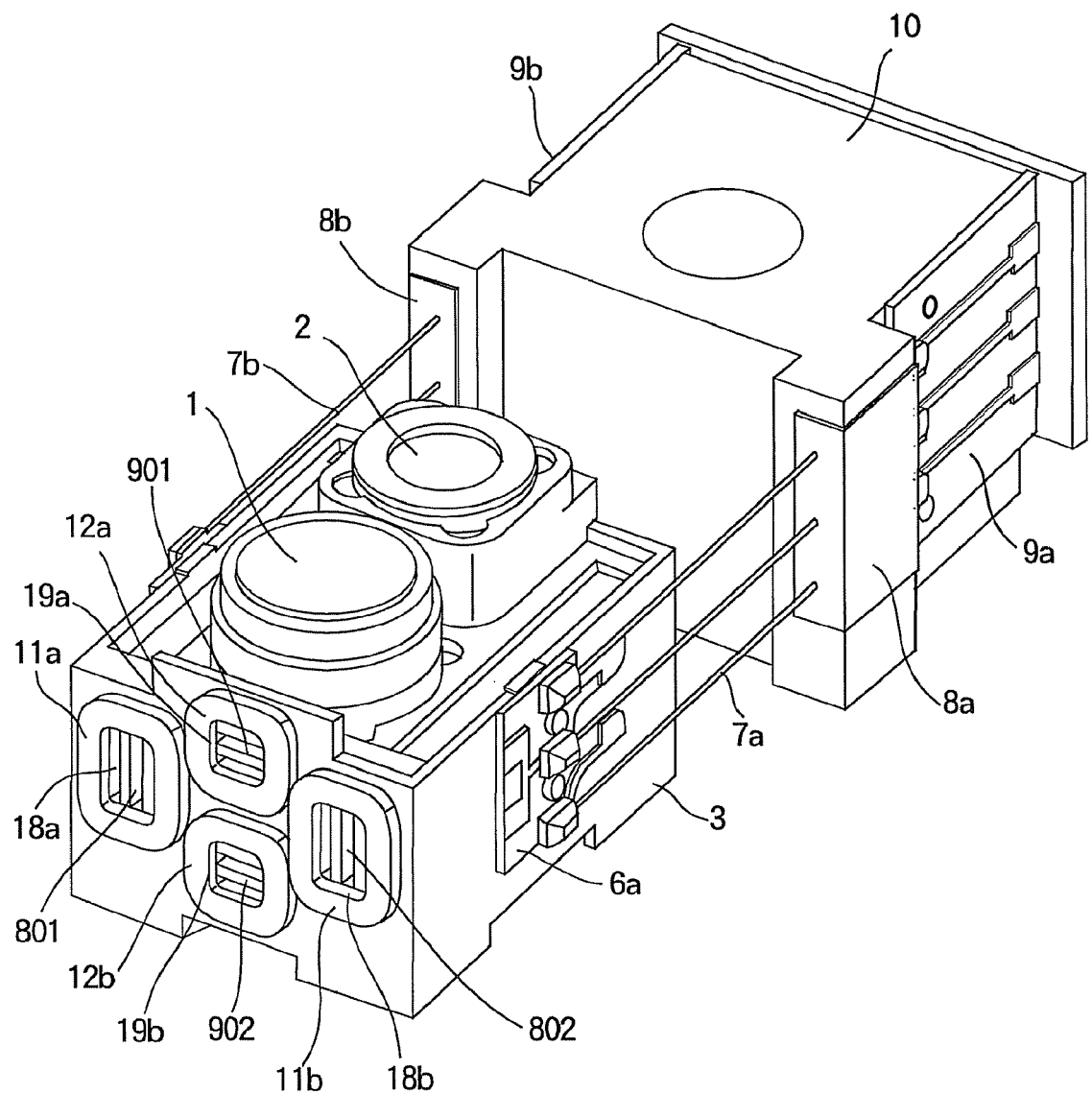
FIG. 16 is a perspective view showing a movable part and its surroundings of an objective lens driving device according to Embodiment 3 of the present invention.

FIG. 16 is a perspective view showing a movable part and its surroundings of an objective lens driving device according to Embodiment 3 of the present invention.

In the above described Embodiment 1, the lens holder is provided with the convex portions having the groove portions and formed by resin molding, and the convex portions are subjected to the plating treatment. In contrast, in Embodiment 3, concave portions having ribs are provided on the lens holder 3.

As shown in FIG. 16, concave portions 18a, 18b, 19a and 19b are formed on the front end surface of the lens holder 3 so as to be disposed in the hollow portions in the windings of the focusing driving electromagnetic coils 11a and 11b and the tracking driving electromagnetic coils 12a and 12b.

Ribs 801, 802, 901 and 902 are provided in the concave portions 18a, 18b, 19a and 19b so that at least one rib is provided in each concave portion.

The rib 801 is disposed so as to face the boundary (FIG. 8(B)) between the N-pole region 41 and the S-pole region 43 of the magnet 4a which are adjacent to each other in the focusing direction. Similarly, the rib 802 is disposed so as to face the boundary (FIG. 8(B)) between the S-pole region 42 and the N-pole region 44 of the magnet 4a which are adjacent to each other in the focusing direction.

Moreover, the rib 901 is disposed so as to face the boundary (FIG. 8(B)) between the N-pole region 41 and the S-pole region 42 of the magnet 4a which are adjacent to each other in the tracking direction. Similarly, the rib 902 is disposed so as to face the boundary (FIG. 8(B)) between the S-pole region 43 and the N-pole region 44 of the magnet 4a which are adjacent to each other in the tracking direction.

Further, the rib 801 in the concave portion 18a extends in the direction of the magnetic flux lines between the N-pole surface 41 and the S-pole surface 43 facing the concave portion 18a, i.e., extends in the focusing direction. Similarly, the rib 802 in the concave portion 18b extends in the direction of the magnetic flux lines between the S-pole surface 42 and the N-pole surface 44 facing the concave portion 18b, i.e., extends in the focusing direction.

Moreover, the rib 901 in the concave portion 19a extends in the direction of the magnetic flux lines between the N-pole surface 41 and the S-pole surface 42 facing the concave portion 19a, i.e., extends in the tracking direction. Similarly, the rib 902 in the concave portion 19b extends in the direction of the magnetic flux lines between the S-pole surface 43 and the N-pole surface 44 facing the concave portion 19b, i.e., extends in the tracking direction.

In this regard, although not shown in FIG. 16, concave portions and ribs are formed on the rear end surface of the lens holder 3, which are the same as the above described concave portions 18a, 18b, 19a and 19b and the ribs 801, 802, 901 and 902.

Surfaces of the concave portions 18a, 18b, 19a and 19b are subjected to plating treatment using material having magnetic property (such as nickel). Moreover, surfaces (particularly, both side surfaces) of the ribs 801, 802, 901 and 902 are subjected to plating treatment using material having magnetic property. It goes without saying that it is also possible to use other method than the plating treatment as long as at least the surfaces of the respective concave portions (including the side surfaces of the ribs) are formed of material having magnetic property.

The concave portions 18a, 18b, 19a and 19b with the ribs 801, 802, 901 and 902 according to this embodiment act in a similar manner to convex portions with the groove portions according to Embodiment 1.

To be more specific, if the inclination of the lens holder 3 occurs, torques are exerted on the respective ribs 801, 802, 901 and 902 so as to bring the extending directions of the ribs 801, 802, 901 and 902 to be parallel to the magnetic flux lines at the magnetic pole boundaries facing the respective ribs.

The torques exerted on the respective ribs 801, 802, 901 and 902 are integrated to produce a torque that causes the movable part including the lens holder 3: to rotate about the gravity center. This torque acts to cancel the torque (for example, the torque T11 shown in FIG. 6) causing the inclination of the movable part. As a result, the inclination of the movable part including the lens holder 3 can be suppressed, and the angular variation of the optical axes of the objective lenses 1 and 2 can be suppressed.

As described above, according to the objective lens driving device of this embodiment, the concave portions 18a, 18b, 19a and 19b, at least the surface of which are formed of material having magnetic property, are provided on the surfaces of the lens holder 3 facing the magnets 4a and 4b. Further, the ribs are provided in the concave portions 18a, 18b, 19a and 19b so that at least one rib is provided in each concave portion, and the ribs extend parallel to the direction of the magnetic flux lines of the magnets 4a and 4b facing the respective concave portions. With this configuration, when the inclination of the lens holder 3 occurs, the torque is exerted on the lens holder 3 in the direction so as to bring the extending directions of the respective ribs to be parallel to the direction of the magnetic flux lines. With this torque, the inclination of the lens holder 3 is suppressed, and the angular variations of the optical axes of the objective lenses 1 and 2 are suppressed.

Moreover, the respective concave portions 18a-18d and 19a-19d are disposed inside the focusing driving electromagnetic coils 11a-11d and the tracking driving electromagnetic coils 12a-12d, and therefore the concave portions 18a-18d and 19a-19d can be faced with the magnetic pole boundaries using simple configuration.

Moreover, the concave portions 18a-18d and 19a-19d are provided on the surfaces of the lens holder 3 facing the magnets 4a and 4b at positions symmetrical to each other in the focusing direction and in the tracking direction with respect to the gravity center of the lens holder 3. Therefore, the torques generated at the respective concave portions 18a-18d and 19a-19d can be integrated, so as to produce the torque in the direction in which the inclination of the lens holder 3 is suppressed.

In the objective lens driving device having a plurality of working distances corresponding to the kinds (CD, DVD, BD or the like) of the optical discs, there are different reference positions of the lens holder 3 in the focusing direction according to the kinds of the optical discs. Since the magnetic fields distribution varies depending on the reference position, there is a possibility that the torque may be exerted on the lens holder 3 so as to cause the inclination of the lens holder 3 as described with reference to, by way of example, FIG. 6. Conventionally, it has been difficult to suppress this inclination. In contrast, in the objective lens driving devices according to the above described Embodiments 1, 2 and 3, a torque is generated by the action of the convex portions (Embodiment 1), the magnetic pieces (Embodiment 2) and the concave portions (Embodiment 3) so as to cancel the torque that causes the inclination of the lens holder 3, and therefore it becomes possible to suppress the inclination of the lens holder 3 and to keep the optical axes of the objective lenses perpendicular to the recording surface of the optical disc. Accordingly, even in the objective lens driving device having a plurality of working distances corresponding to the kinds of the optical discs, the angular variation of the optical axis of the objective lens can be suppressed without a need for complicated adjustment.

In this regard, in the above described Embodiments 1, 2 and 3, four convex portions (Embodiment 1), four magnetic pieces (Embodiment 2) or four concave portions (Embodiment 3) are provided on each of the surfaces of the lens holder 3 facing the magnets 4a and 4b. However, the number of the convex portions, the magnetic pieces and the concave portions can be respectively less than four, or more than four. Moreover, the numbers of the groove portions and the ribs provided on the respective convex portions and concave portions are arbitrary.

Moreover, it is also possible to dispose the above described convex portions (Embodiment 1), magnetic pieces (Embodiment 2) and concave portions (Embodiment 3) on positions other than inside the respective electromagnetic coils, as long as the positions face the magnetic pole boundaries of the magnet.

The invention claimed is:

1. An objective lens driving device comprising:
an objective lens;
a lens holder holding the objective lens;
a stationary part that supports the lens holder via wires;
an electromagnetic coil provided on the lens holder; and
a magnet provided on the stationary part and magnetized in a multipolar manner so that different magnetic pole surfaces are arranged on a surface of the magnet facing the electromagnetic coil;
wherein the lens holder has a convex portion on a surface thereof facing the magnet;
wherein the convex portion has at least one groove portion extending parallel to a direction of magnetic flux lines of the magnet facing the convex portion; and
wherein at least a surface of the convex portion is formed of material having magnetic property.

2. The objective lens driving device according to claim 1, wherein the convex portion faces a boundary between different magnetic pole surfaces of the magnet.

3. The objective lens driving device according to claim 2, wherein an extending direction of the groove portion is a direction in which the different magnetic pole surfaces of the magnet are adjacent to each other via the boundary facing the convex portion.

4. The objective lens driving device according to claim 1, wherein the convex portion is disposed inside the electromagnetic coil.

5. An optical pickup device comprising:
said objective lens driving device according to claim 1.

6. An objective lens driving device comprising:
an objective lens;
a lens holder holding the objective lens;
a stationary part that supports the lens holder via wires;
an electromagnetic coil provided on the lens holder; and
a magnet provided on the stationary part and magnetized in a multipolar manner so that different magnetic pole surfaces are arranged on a surface of the magnet facing the electromagnetic coil;
wherein the lens holder has a magnetic piece on a surface thereof facing the magnet; and
wherein an extending direction of the magnetic piece is parallel to a direction of magnetic flux lines of the magnet facing the magnetic piece.

7. The objective lens driving device according to claim 6, wherein the magnetic piece faces a boundary between different magnetic pole surfaces of the magnet.

8. The objective lens driving device according to claim 7, wherein the extending direction of the magnetic piece is a direction in which the different magnetic pole surfaces of the magnet are adjacent to each other via the boundary facing the magnetic piece.

9. The objective lens driving device according to claim 6, wherein the magnetic piece is disposed inside the electromagnetic coil.

10. An optical pickup device comprising:
said objective lens driving device according to claim 6.

11. An objective lens driving device comprising:
an objective lens;
a lens holder holding the objective lens;
a stationary part that supports the lens holder via wires;
an electromagnetic coil provided on the lens holder; and
a magnet provided on the stationary part and magnetized in a multipolar manner so that different magnetic pole surfaces are arranged on a surface of the magnet facing the electromagnetic coil;
wherein the lens holder has a concave portion on a surface thereof facing the magnet;
wherein the concave portion has at least one rib portion extending parallel to a direction of magnetic flux lines of the magnet facing the concave portion; and
wherein at least a surface of the concave portion is formed of material having magnetic property.

12. The objective lens driving device according to claim 11, wherein the concave portion faces a boundary between different magnetic pole surfaces of the magnet.

13. The objective lens driving device according to claim 12, wherein an extending direction of the rib is a direction in which the different magnetic pole surfaces of the magnet are adjacent to each other via the boundary facing the concave portion.

14. The objective lens driving device according to claim 11, wherein the rib is disposed inside the electromagnetic coil.

15. An optical pickup device comprising:
said objective lens driving device according to claim 11.

* * * * *